United States Patent [19]

Hida

[11] Patent Number: 4,990,295

[45] Date of Patent: * Feb. 5, 1991

[54] PROCESS FOR MAKING A SILICON CARBIDE COMPOSITION

[75] Inventor: George T. Hida, North Tonawanda, N.Y.

[73] Assignee: Benchmark Structural Ceramics Corporation, Amherst, N.Y.

[*] Notice: The portion of the term of this patent subsequent to Sep. 12, 2006 has been disclaimed.

[21] Appl. No.: 279,428

[22] Filed: Dec. 2, 1988

Related U.S. Application Data

[63] Continuation-in-part of Ser. No. 254,178, Oct. 6, 1988.

[51] Int. Cl.$^5$ .................. C04B 35/10; C04B 35/56
[52] U.S. Cl. ................................ 264/65; 501/89; 264/66
[58] Field of Search .............. 501/95, 89, 99, 81; 264/66, 65; 423/345, 645

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Hayashi et al. | 106/65 |
| 4,284,612 | 8/1981 | Horne, Jr. et al. | 423/345 |

OTHER PUBLICATIONS

"Study of Solid-State Aluminothermal Reactions: Influence of Activation and Moderation Processes" George T. Hida (Thesis, Israel Institute of Technology, Haifa, Israel, Apr., 1987).

Primary Examiner—Mark L. Bell
Assistant Examiner—Deborah Jones
Attorney, Agent, or Firm—Howard J. Greenwald

[57] ABSTRACT

A process for preparing a ceramic composite which is comprised of alpha silicon carbide whiskers and alpha aluminum oxide powder is disclosed. In the first step of this process, there is provided a slurry comprised of from about 80 to about 92 volume percent of solid material and from about 20 to about 8 volume percent of a non-aqueous liquid. In this slurry, the solid material comprises from about 30 to about 38 weight percent of aluminum material, from about 10 to about 14 weight percent of amorphous carbon, and from about 52 to about 62 weight percent of silica.

The slurry provided in the first step of this process is thereafter passed through a twin-deck sieve to pelletize it.

The pellets are then dried to a moisture content of from about 0.1 to about 1.0 percent, preheated to a temperature of from about 200 to about 300 degrees centigrade, and then ignited with an ignition source at a temperature of at least 670 degrees centigrade, thereby combusting and producing a material comprises of a composite containing alpha silicon carbide and alumina.

15 Claims, 1 Drawing Sheet

PROCESS FOR MAKING A SILICON CARBIDE COMPOSITION

CROSS-REFERENCE TO RELATED APPLICATION

This is a continuation-in-part application of applicant's copending application U.S. Ser. No. 254,178, filed Oct. 6, 1988 for "PROCESS FOR MAKING A SILICON CARBIDE WHISKER REINFORCED ALUMINA CERAMIC COMPOSITE PRECURSOR."

FIELD OF THE INVENTION

A process for preparing a ceramic composite which is comprised of silicon carbide whiskers and alumina powder.

BACKGROUND OF THE INVENTION

Ceramic composites comprised of silicon carbide whiskers and alumina powder are well known to the prior art. Thus, by way of illustration, U.S. Pat. No. 4,543,345 discloses a silicon carbide whisker-alumina ceramic composite with good fracture toughness. U.S. Pat. No. 4,652,413 discloses that silicon carbide whisker-reinforced alumina ceramic articles are useful as structural materials for the fabrication of turbocharger rotors, cylinders, bearings, and other components of heat engines.

One problem with the ceramic composites presently available is that they cost from about eighty to about one hundred and twenty dollars per pound, a price which makes them too expensive for most applications.

In 1987, applicant George T. Hida disclosed a process for preparing a silicon carbide-whisker/alumina composite. In his Ph.D. thesis, which was entitled "Study of Solid-State Aluminothermal Reactions: Influence of Activation and Moderation Processes," which was submitted to the Senate of the Technicron—Israel Institute of Technology in Haifa, Israel in February of 1987, and which was published in April of 1987, a reaction was disclosed in which three moles of silica were reacted with four moles of aluminum and three moles of carbon. The silica reagent used was 200/230 mesh fraction quartz sand; the aluminum reagent used was −325 mesh aluminum powder; and the carbon reagent used was carbon black. Stoichiometric amounts of these reagents were mixed, the mixture was compacted by cold pressing it in a die, and the pressed pellets were placed in a furnace which had been preheated to 720 degrees and were thereafter ignited.

The process disclosed in Hida's 1987 thesis was a substantial improvement over prior art processes for preparing silicon carbide whisker/alumina composite materials. However, it did not reduce the cost of making the composite down to commercially suitable levels.

It is an object of this invention to provide a process for preparing a silicon carbide whisker/alumina composite at a cost which is substantially cheaper than is currently possible.

SUMMARY OF THE INVENTION

In accordance with this invention, there is provided a process for preparing a ceramic composite which is comprised of alpha silicon carbide whiskers and alpha aluminum oxide powder.

In the first step of this process, a slurry is provided which is comprised of from about 80 to about 92 volume percent of solid material and from about 20 to about 8 volume percent of a non-aqueous liquid. In this slurry, the solid material comprises from about 30 to about 38 weight percent of aluminum material, from about 10 to about 14 weight percent of amorphous carbon, from about 52 to about 62 weight percent of silica, from about 1 to about 5 weight percent of a source in a condensed phase of carbon monoxide, from about 1 to about 5 weight percent of a source in a condensed phase of hydrogen fluoride, and from about 0.1 to about 1.0 weight percent of a metal-containing component selected from the group consisting of ferric oxide, ferroferric oxide, manganese dioxide, titanium dioxide, and mixtures thereof. The aluminum material has a specific surface area of from about 0.2 to about 1.1 square meters per gram, has a particle size distribution which ranges from about 4 to about 28 microns, and has at least 80 weight percent of its particles in the range of from about 6 to about 12 microns. The amorphous carbon has a specific surface area of at least 20 square meters per gram.

The slurry provided in the first step of the process is preferably prepared by a process comprising the steps of: (1) mixing said nonaqueous liquid with said source of carbon monoxide; (2) mixing said amorphous carbon with said metal-containing component and said source of hydrogen fluoride; (3) mixing said silica with said mixture of nonaqueous liquid and carbon monoxide source to produce a well-mixed silica slurry comprised of from about 35 to about 55 volume percent of solid material; (4) thereafter mixing said well-mixed silica slurry with sufficient amounts of said aluminum material and said carbon/metal-containing component/hydrogen fluoride source mixture to produce a slurry whose solid material is comprised of from about 30 to about 38 weight percent of aluminum material, from about 10 to about 14 weight percent of amorphous carbon, from about 52 to about 62 weight percent of silica, from about 1 to about 5 weight percent of said source of carbon monoxide, from about 1 to about 5 weight percent of said source of hydrogen fluoride, and from about 0.1 to about 1.0 weight percent of said metal-containing component; and (5) thereafter drying said slurry to a solids content of from about 80 to about 92 volume percent.

The slurry provided in the first step of this process is thereafter pelletized to provide a multiplicity of pellets comprised of from about 80 to about 92 volume percent of said solids, by passing the slurry through a multi-deck sieve, wherein the top sieve has sieve openings of from about 8 to about 14 millimeters, and the bottom sieve has sieve openings smaller than those of the top sieve but no smaller than about 4 millimeters.

In the third step of the process, the pellets are dried to a moisture content of from about 0.1 to about 1.0 weight percent.

In the fourth step of the process, the dried pellets are preheated to a temperature of from about 200 to about 300 degrees centigrade.

In the fifth step of the process, the preheated pellets are ignited with an ignition source at a temperature of at least 670 degrees centigrade, thereby combusting them and producing a material comprised of a composite containing alpha silicon carbide and alumina.

DESCRIPTION OF THE DRAWING

The present invention will be more fully understood by reference to the following detailed description thereof, when read in conjunction with the attached drawing, wherein.

DESCRIPTION OF THE PREFERRED EMBODIMENTS

Figure 1:
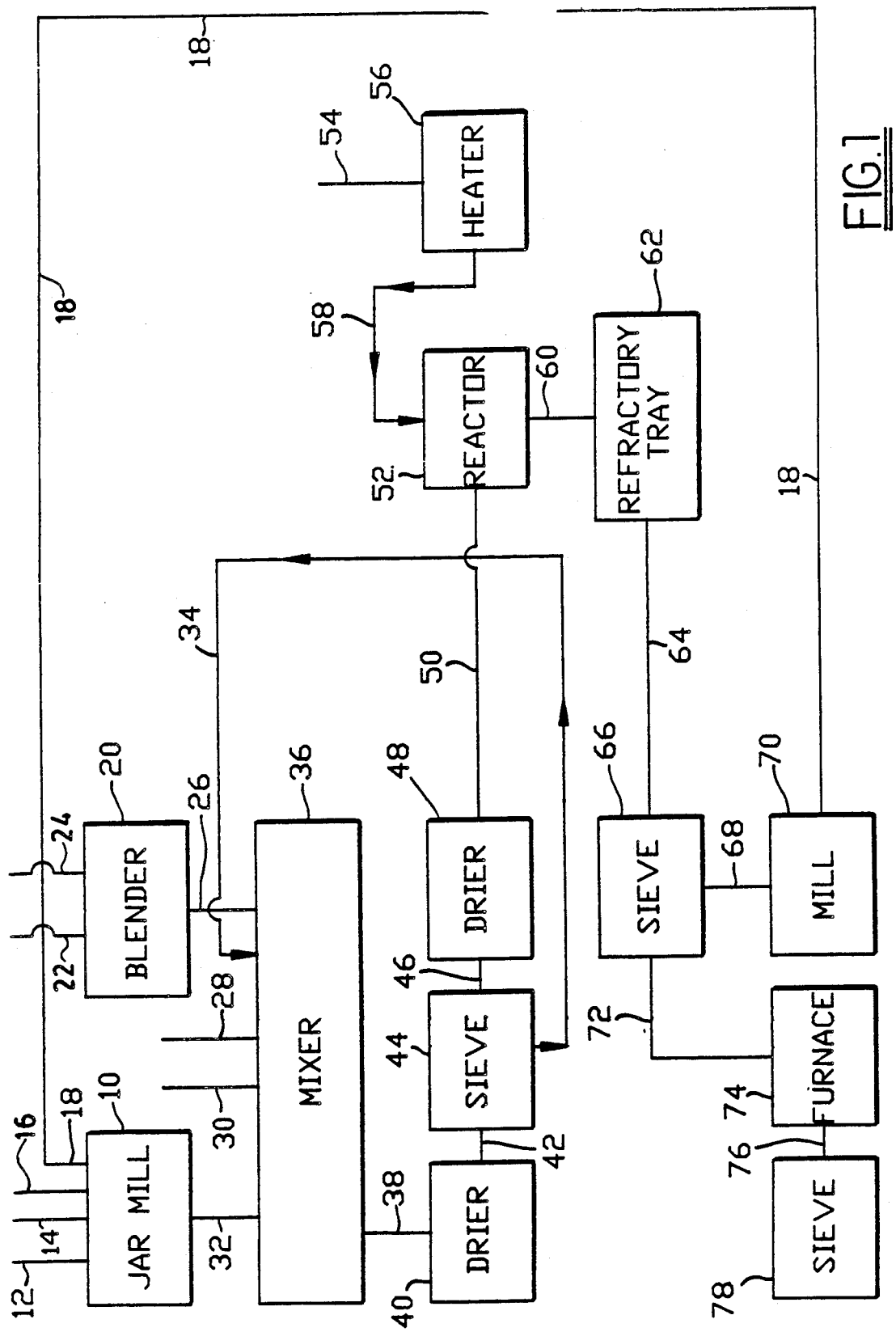
FIG. 1 is a flow chart illustrating the preferred process of this invention.

In the process of this invention, a composite of alpha silicon carbide whiskers (as reinforcement) and alpha aluminum oxide (as matrix material) is obtained with a substantially higher yield of the silicon carbide component by an aluminothermic reduction process followed by in situ synthesis of silicon carbide. This composite can be hot-pressed by conventional means to prepare high-strength parts.

The term whisker, as used in this specification, refers to a needle-like single crystal of metallic and nonmetallic compounds; this crystalline form possesses very good strength properties, approaching maximum theoretical strength and making it suitable for reinforcement of metal, ceramic, glass, or polymer matrices. The term silicon carbide whiskers refers to single crystals in needle-like form containing only the alpha silicon carbide phase, having a diameter of from about 0.5 to about 5 microns, having a length of at least about 10 microns, and having an aspect ratio of less than about 1:10. The term aspect ratio means the ratio of the diameter (or the equivalent diameter) of the whisker, divided by its length. In one preferred embodiment, the aspect ratio of the whisker is less than about 1:20.

The silicon carbide whiskers comprising the composite of this invention can have different cross-sectional shapes. Thus, e.g., they may be circular, square, rectangular, hexagonal, and the like. When the whisker has a substantially circular cross-sectional shape, then its diameter will be from about 0.5 to about 5.0 microns and, preferably, from about 0.5 to about 1.5 microns. When the cross-sectional shape of the whisker is not substantially circular, then it will have an equivalent diameter of from about 0.5 to about 3.0 microns and, preferably, from about 0.5 to about 1.5 microns.

The silicon carbide whiskers comprising the composite of this invention consist essentially of alpha silicon carbide. As is known to those skilled in the art, the crystalline structure of silicon carbide derives from the diamond structure in which half of the carbon atoms are replaced by silicon atoms. Each atom is surrounded tetrahedrally by four different atoms and linked with them by covalent bonds. Alpha silicon carbide is a modification of the crystalline structure having a hexagonal crystalline network with several arrangements coexisting within the same conditions of temperature and pressure and called polytypes. See, e.g., pages 486 to 488 of R. Abramovici's "Materii Prime Cermice," (Institutul Politechnic, Traian Vuia, Timisoara, Romania, 1974). Also see pages 366–367 of the McGraw-Hill Encyclopedia of Science & Technology, Volume 12 (McGraw-Hill Book Company, New York, 1977). The disclosures of each of these publications are hereby incorporated by reference into this specification.

The composite produced by the process of this invention is also comprised of alpha aluminum oxide. As used in this specification, the term alpha aluminum oxide refers to the most stable form of aluminum oxide, which is also called "corundum". See, e.g., pages 331–332 of said Abramovici book.

In the first step of the process of this invention, a multiplicity of pellets are first prepared. Each of these pellets has a specified ratio of silica, aluminum, and carbon The pellets used in the process of this invention contain from about 30 to about 38 weight percent of aluminum material selected from the group consisting of aluminum and aluminum alloy, by total weight of silica, aluminum, and carbon in the pellets.

The aluminum or aluminum alloy should be in powder form and will have a specific surface area of from about 0.2 to about 1.1 square meters per gram and, preferably, from about 0.6 to about 0.7 square meters per gram.

Either pure aluminum, aluminum alloy material, or mixtures thereof may be used. Suitable aluminum alloys include, for example, alloys of aluminum with lithium, silicon, magnesium, manganese, iron, and the like.

In one embodiment, the aluminum material used is in the form of fine aluminum flakes. Thus, by way of illustration, one may use fine aluminum flakes obtainable from the Riedel de Haen Company of West Germany (catalog number 110100). This material is a coated aluminum comprised of 94 percent aluminum and less than 0.1 percent of oxygen; and at least about 80 percent of these flakes are smaller than 9 microns.

In the pellets and slurry used in the process of this invention, the specified weight ratio of aluminum is based upon the concentration of pure aluminum. When an aluminum alloy material is used, or when a mixture of aluminum and aluminum alloy material is used, the aluminum content of the alloy is first calculated, and this aluminum content may then be used to determine the aluminum content of the pellet.

The particle size distribution of the aluminum material will range from about 4 to about 28 microns and, preferably, will be from about 6 to about 12 microns. Particle size analysis may be conducted by means well known to those skilled in the art. Thus, for example, one can use the procedure described on pages 8-2 to 8-8 of Perry and Chilton's "Chemical Engineers' Handbook," Fifth Edition (McGraw-Hill Company, New York, 1973). The Perry and Chilton book also describes the specific surface area test described elsewhere in this specification (see, e.g., page 8-7); the disclosure of the entire Perry and Chilton book is hereby incorporated by reference into this specification. Test methods are also described in the 1988 Annual Book of ASTM Standards, Section 15. Volume 15.02 (ASTM, 1916 Race Street, Philadelphia, Pa., 1988), the disclosure of which is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. In an even more preferred embodiment, at least about 90 weight percent of the aluminum particles have a diameter of from about 6 to about 12 microns.

In one embodiment, the aluminum material contains from about 0 to about 1.0 percent, by weight of aluminum material, of combined oxygen. As used in this specification, the term combined oxygen refers to oxygen which is combined with aluminum and/or aluminum ally and, usually, is in the form of a metal oxide.

The amount of combined oxygen is determined by evaluating the total oxygen present by conventional means such as, e.g., spectral analysis.

The pellets and the slurry used in the process of this invention are also comprised of amorphous carbon. These materials comprise from about 10 to about 14 weight percent, by total weight of silica, aluminum, and carbon, of amorphous carbon.

By way of illustration, one can use carbon black obtained from the Pelleter Company of the United States (code "SRF") which has a specific surface area of 27.1 square meters per gram and is comprised of 99.28 percent of carbon, 0.37 percent of hydrogen, 0.03 percent of sulfur, 0.25 percent of ash, and 0.07 percent of oxygen. By way of further illustration, one can use amorphous carbon obtainable from the Aldrich Chemical Company, Inc. of 940 West Saint Paul Avenue, Milwaukee, Wis. and sold as code 27,720-7 in the 1988-1989 Aldrich catalog.

It is essential that the carbon used in the pellet of this invention be amorphous and have a specific surface area of at least about 4 square meters per gram. The specific surface area may be determined by means well known to those skilled in the art. Thus for example, specific surface area, or the surface per unit mass of material (square meters per gram) can be measured by using gas adsorption techniques via the well known BET equation. This measurement can be conducted on a Micromeritics Flow Sorb II 2300, model 2300/00000/00 (made by Micromeritics Company, Norcross, Ga.). The test procedure is described in the instruction manual for this machine (see, e.g., Manual P/N: 230/42804/00, published by Micromeritics in 1985). As is known to those skilled in the art, this measurement also may be conducted on the Monosorb model MS-4 single point analyzer or the Quantosorb QS-7 multi-point analyzer, both of which are manufactured by the Quantachrome Corporation of 6 Aerial Way, Syosset, N.Y. 11791.

In one preferred embodiment, the amorphous carbon contains less than about 1.5 percent, by weight of carbon, of combined sulfur. The amount of combined sulfur may be determined by means well known to those skilled in the art. Thus, by way of illustration, one can use the combustion method described on pages 9-4 to 9-5 of said Perry and Chilton's "Chemical Engineers' Handbook."

The pellets used in this invention are also comprised of from about 52 to about 62 weight percent of silica, by total weight of silica, aluminum, and carbon in the pellet.

By way of illustration, a suitable silica which may be used in the process of this invention is "Cab-O-Sil M-5" Fumed Silica, an amorphous silicon dioxide manufactured by the Cabot Corporation, Cab-O-Sil Division, of Tuscola, Ill. 61953; this silica has a specific surface area of 200 plus or minus 25 square meters per gram; and the total oxygen content of this silica indicates that it contains less than 1.0 percent of silicon-silicon bonds.

The silica used to prepare the pellets of this invention preferably has a specific surface area of from about 1.2 to about 400 square meters per gram and, more preferably, from about 50 to about 300 square meters per gram. In an even more preferred embodiment, the specific surface area of the silica is from about 125 to about 250 square meters per gram. In the most preferred embodiment, the silica has a specific surface area of from about 175 to about 225 square meters per gram.

The silica used can be either amorphous or crystalline. As used in this specification, the term amorphous refers to a solid substance which, although it may possess microcrystals, does not indicate the existence of any crystalline structure with X-ray diffraction. Even though the amorphous material may possess some degree of crystallinity, such crystallinity is less than that required for detection with X-ray diffraction technology. Thus, for example, a solid material which does not crystallize and which does not possess definite geometrical shape (as determined by X-ray diffraction analysis) is amorphous within the meaning of this invention.

The term crystalline, as used in this invention, indicates a substance which, when subjected to X-ray diffraction analysis, indicates the presence of crystals.

It is preferred that the silica used in the process of this invention be amorphous. It is also preferred that the silica contain less than about 1.0 percent, by total weight of silica, of silicon-silicon bonds. The extent to which the silica contains silicon-silicon bonds may be determined by analyzing the total oxygen content of the silica; to the extent, if any, that the total oxygen content is less than stoichiometric, silicon-silicon bonds are present, and the extent to which they are present can be calculated.

In one preferred embodiment, the pellets of this invention are comprised of from about 1 to about 5 percent, by weight of silica, aluminum, and carbon, of a source of carbon monoxide in a condensed phase. The term condensed phase, as used in this specification, refers to a material which is either liquid or solid but not gaseous. This carbon monoxide source is designed to generate carbon monoxide when it is subjected to a temperature of from about 700 to about 1,600 degrees Centigrade for no more than about 1.0 millisecond. Suitable sources of carbon monoxide include fatty acids containing from about 10 to about 24 carbon atoms which can be monocarboxylic or dicarboxylic. Suitable fatty acids include acids such as caprylic acid, capric acid, lauric acid, myristic acid, palmitic acid, stearic acid, oleic acid, linoleic acid, erucic acid, brasidic acid, elaidic acid, stearolic acid, mixtures thereof, and the like. Other sources of carbon monoxide include fats corresponding to said fatty acids.

Stearic acid is a preferred source of carbon monoxide. By way of illustration, one suitable stearic acid may be obtained from the Aldrich Chemical Company of 940 West Saint Paul Avenue, Milwaukee, Wis. (catalog number 17,536-6 of the 1986-1987 Aldrich catalog).

In one preferred embodiment, the pellet used in the process of this invention is comprised of from about 1 to about 5 weight percent, by combined weight of silica, aluminum, and carbon, of a source of hydrogen fluoride in a condensed phase. In a more preferred embodiment, from about 2 to about 4 weight percent of the source of hydrogen fluoride is present in the pellet. In the most preferred embodiment, about 3 percent of the source of hydrogen fluoride is present in the reaction mixture.

The source of hydrogen fluoride is designed to generate hydrogen fluoride when subjected to a temperature of from about 200 to about 400 degrees centigrade for about 1 to about 20 minutes. Potassium hydrogen fluoride is a suitable source of hydrogen fluoride, and it may be obtained, e.g., from Alfa Products, Thiokol Ventron Division, 152 Andover Street, Danvers, Mass. (catalog number 89714). By way of illustration and not limitation, other suitable sources of hydrogen fluoride include any material which will contain the bifluor ion [$HF_2$]

such as, e.g., sodium hydrogen fluoride, ammonium hydrogen fluoride, and the like.

In one preferred embodiment, the pellets of this invention are comprised of from about 0.1 to about 1.0 percent (by weight of silica, aluminum, and carbon) of a metal-containing component selected from the group consisting of ferric oxide, ferro-ferric oxide, manganese dioxide, and titanium dioxide. It is preferred to use from about 0.5 to about 1.0 weight percent of this metal-containing component. In the most preferred embodiment, said component is selected from the group consisting of ferric oxide and manganese dioxide.

By way of illustration, one may use a ferric oxide obtained from the Research Organic/Inorganic Chemical Corp. of 9068 DeGramo Street, Sun Valley, Calif. 913252.

In one especially preferred embodiment, the pellets are comprised of the specified amounts of silica, aluminum, and carbon (each by total weight of pellet) and, additionally, the specified amounts of the source of carbon monoxide, the source of hydrogen fluoride, and the metal-containing component.

In one preferred embodiment, certain specified mixtures of various components are first prepared and thereafter mixed with each other. A mixture of the carbon monoxide source and nonaqueous liquid is prepared, and this mixture is then mixed with silica to prepare a silica slurry. A mixture of the carbon and any metal-containing component used and any source of hydrogen fluoride used and any moderator used is prepared. After these two mixtures have been prepared, the silica slurry is mixed with the aluminum material and the carbon-containing mixture.

The carbon material, which preferably is amorphous, is mixed with any source(s) of hydrogen fluoride used, and/or any metal-containing component used, and/or any moderator used; and this carbon-containing mixture is thereafter mixed with a silica slurry and with aluminum. In this embodiment, it is preferred to grind the carbon and the sources of carbon monoxide and/or hydrogen fluoride and/or metal-containing component in a jar mill to slightly agglomerate them. Thus, for example, the mixture can be ground for from about 1 to about 2 hours with alumina grinding media.

The specified amounts of silica, aluminum, carbon, and sources of carbon monoxide, hydrogen fluoride, and metal-containing component are then pelletized in order to prepare a multiplicity of pellets with a specified size. These pellets are substantially spherical, although other irregularly-shaped pellets also may be used. The pellets used in the process of this invention will preferably have a maximum dimension of about 12 millimeters, although pellets with larger maximum dimensions also can be used. The pellets used will have a minimum dimension of about 4 millimeters. Thus, in the preferred embodiment wherein spherical pellets are used, the diameter of these pellets will range from about 4 to about 12 millimeters and, preferably, from about 6 to about 10 millimeters.

The pellets produced by the process of applicant's invention contain from about 80 to about 92 volume percent of solid material. The solid material in the pellets has the same composition as the slurry used to prepare the pellets.

The pellets produced by the process of this invention have an apparent density (bulk density) of from about 0.3 to about 1.7 grams per cubic centimeter. It is preferred that each pellet have a density of from about 0.3 to about 0.7 grams per cubic centimeter. It is even more preferred that such density be from abot 0.3 to about 0.5 grams per cubic centimeter. Bulk density may be determined by means well known to those skilled in the art. Thus, by way of illustration and not limitatin, one can use the procedures described in J. T. Jones and M. F. Berard's "Ceramics: Industrial Processing and Testing" (The Iowa State University Press, Ames, Iowa, 1972), the disclosure of which is hereby incorporated by reference into this specification.

The pellets produced by the process of applicant's copending U.S. patent application Ser. No. 254,175 (filed Oct. 6, 1988) also contain from about 80 to about 92 volume percent of solid material and also have a minimum dimension of about 4 millimeters; the disclosure of such copending case is hereby incorporated by reference into this specification. However, these latter pellets each have a density of from about 0.3 to about 1.2 grams per cubic centimeter; and the solid material in these pellets contains fromabout 17 to about 22 weight of aluminum material, from about 19 to about 24 weight percent of amorphous carbon, from about 56 to about 65 weight percent of silica, from about 1 to about 5 weight percent of a source of hydrogen fluoride, from about 1 to about 5 weight percent of a source of carbon monoxide, and from about 0.1 to about 1.0 weight percent of said metal-containing component.

Referring to FIG. 1, a preferred process for preparing the pellets of this invention is disclosed. In this process, into jar mill 10 is fed amorphous carbon via line 12, ferric oxide via line 14, and potassium hydrogen fluoride via line 16. Other mills also can be used instead of jar mill 10; thus, e.g., one can use the mills described on pages 8-25 to 8-45 of said Perry and Chilton's handbook.

In general, the carbon may be mixed with any source of metal-containing component used, any source of hydrogen used, and any moderator (described later on in this specification) used until a carbon agglomerate is obtained. In this step, the carbon, the source of metal-containing component, and/or the source of hydrogen fluoride, and/or the moderator are ground in a mill. It is preferred to grind these materials for from about 1 to about 2 hours in a jar mill with alumina and/or zirconia grinding media. However, other grinding media, grinding devices, and grinding times can be used to obtain a similarly ground mixture. The ground carbon agglomerate mixture is characterized by having a grey uniform color without any visible red spots or white spots.

One Amorphous carbon which can be used is Huber Corporation's pelletized carbon black, type N990; 222 grams of such carbon can be charged to mill 10. One ferric oxide which can be used is Pfizer Corporation's synthetic iron oxide type R-2199; 11.0 grams of this ferric oxide can be charged to mill 10.

In one embodiment, a ground moderator (described later on) is fed to mill 10 via line 18; 40 grams of moderator can be fed to the mill. This moderator may contain about 0.1 percent (by weight of moderator) of a surfactant such as, e.g., oleic acid.

It is preferred that jar mill 10 contain sintered alumina and/or zirconia grinding media. The reagents in jar mill 10 should be ground for about 2.0 hours at a speed of about 90 r.p.m. to produce a homogeneous mixture which has a uniform grey color and no visible red or white spots.

In addition to preparing the carbon agglomerate mixture described above, one should separately prepare a silica slurry by a process in which a mixture of nonaqueous liquid and carbon monoxide source first is prepared, and the mixture of nonaqueous liquid and carbon monoxide source is then mixed with the silica.

The mixture of nonaqueous liquid and carbon monoxide source may be prepared in blender 20. In to blender 20 should be fed a nonaqueous solvent such as, e.g., petroleum ether via line 22. The nonaqueous liquid mixture prepared in blender 20 is thereafter mixed and/or blended with silica.

The nonaqueous liquid used preferably is readily volatile at a temperature of about 80 degrees Centigrade. This nonaqueous liquid may be either a flammable or nonflammable solvent.

It is preferred to use a nonaqueous liquid which volatilizes at a temperature of about 60 degrees Centigrade.

Suitable flammable nonaqueous solvents include acetone, benzene, toluene, n-petroleum ether, and the like. Thus, by way of illustration and not limitation, one can use the petroleum ethers identified as reagents 26,173-4, 30,031-4, and 18,451-9 on page 1183 of the 1988-1989 Aldrich catalog.

In one embodiment, nonflammable, nonaqueous solvents are used. Such suitable solvents include carbon tetrachloride, carbon disulfide, and the like.

A source of carbon monoxide, such as a fatty acid, is mixed with the nonaqueous liquid in the blender. A fatty acid, such as stearic acid, may be fed into the blender via line 24, where it is blended, e.g., with nonaqueous liquid such as petroleum ether. A petroleum ether which may be used is one which is obtained from Aldrich Corporation, has a boiling point of between 35 and 60 degrees centigrade, and is identified as reagent 32,044-7; 200 millimeters of this petroleum ether may be charged to blender 20. A fatty acid which may be used is the stearic acid which is obtained from Aldrich Corporation identified as reagent 17,536-6; 4 grams of this stearic acid may be charged to blender 20. The petroleum ether and the stearic acid may be blended at a speed of about 1,500 r.p.m. Higher or lower blending speeds also may be used.

The petroleum ether mix from blender 20 is mixed with the silica prior to the time any other reagents are contacted with either the silica or the petroleum ether mix; it is critical that the silica be mixed with the nonaqueous solvent/fatty acid mixture prior to the time it is mixed with either the aluminum material and/or the carbon.

The mixing may occur in a mixer other than mixer vessel 36; in the embodiment shown in FIG. 1, the mixing occurs in mixer 36. Suitable mixers are described on pages 19-3 to 19-23 of said Perry and Chilton's handbook.

The petroleum ether mixture and the silica may be mixed and/or blended. When it is mixed, it may be mixed at a speed of about 160 r.p.m. for about 30 minutes until the silica is well mixed. The term well mixed, as used in this case, means well-dispersed.

All of the silica is mixed with a sufficient amount of the nonaqueous solvent/carbon monoxide source mixture to prepare a well-dispersed silica slurry with a solids content of from about 35 to about 55 volume percent and, preferably, from about 40 to about 50 volume percent. Thus, for example, 200 milliliters of the mix from blender 20 may be mixed with 66 grams of silica. A suitable silica introduced via line 28 is Cabot Corporation's Cab-O-Sil Fumed Silica Type M-5. The mixing may be effected by means well known to those skilled in the art. Thus, by way of illustration and not limitation, one may use any of the mixing and/or blending processes and/or apparatuses described on pages 21-30 to 21-36 of Perry and Chilton's "Chemical Engineers' Handbook," Fifth Edition, supra, the disclosure of which is hereby incorporated by reference into this specification. Thus, e.g., one can mix the silica and the solvent with an Eirich mixer.

Those skilled in the art are familiar with the Eirich machines and their use in mixing and/or blending solids. Reference may be had, e.g., to an article entitled "Mixing Techniques and Mixing Equipment" first published in Aufberteitungs-Teklchnick 1976 and republished in publication 10052us-2000-683 by the Eirich Machines Ltd. of 521 Fifth Avenue, New York, N.Y., the disclosure of which is hereby incorporated by reference into this specification. Reference also may be had to other Eirich publications entitled "Eirich Intensive Mixers—The complete range of mixers (GM 885-4us), "Eirich Intensive Mixer for vacuum or pressure operation" (Edition 35 e/486), "Eirich Type R Intensive Mixer," and the like. Each of these publications is hereby incorporated by reference into this specification.

The silica is preferably mixed or blended with the nonaqueous liquid/carbon monoxide source mixture for from about 10 to about 30 minutes until a well-mixed silica slurry is obtained.

After the well-mixed silica/solvent slurry has been prepared, then the aluminum and the ground carbon agglomerate are added to the slurry. It is preferred to add these materials to the vessel in which the silica slurry is present. The vessel is preferably a closed vessel so that, during mixing of the slurry, volatile solvent does not escape from it.

Thus, after the well-mixed silica slurry has been prepared, it is then mixed with aluminum powder, which is added via line 30. A suitable aluminum powder is Alcoa Corporation's atomized aluminum powder, grade 6401. 36 grams of the aluminum powder may be added via line 30 to the reaction mixture.

At the same time that the aluminum powder is added to the reaction mixture, or thereafter, a portion of the carbon agglomerate mixture from mill 10 may be added through line 32 and/or the recycle material may be added through line 34. In general, up to about 20 grams of recycle material may be added through line 34. Thus, in the embodiment illustrated in the drawing, 17 grams of carbon agglomerate from mill 10 are added to the mixing vessel via line 32.

The silica/aluminum/carbon agglomerate solvent mixture thus prepared is then preferably mixed in the closed vessel for at least about 2 hours and, preferably, from about 2 to about 4 hours. Any of the mixers described above can be used to stir this mixture. In one preferred embodiment, in addition to being closed, the mixing vessel is also leakproof. In one embodiment, the reaction mixture is mixed at a speed of 160 r.p.m. for about 4 hours.

Once all the reagents have been added to mixer 36 and mixed, they may discharged from mixer vessel 36 and passed via line 38 to drier 40, wherein the slurry is partially dried.

Suitable driers known to those skilled in the art may be used to dry the slurry. Thus, for example, one may the use the driers described on pages 20-4 to 20-58 of said Perry and Chilton's handbook.

The slurry is partially dried to a moisture content of from about 8 to about 20 percent, by weight.

The partially dried slurry is then pelletized by sieving in a wet-mixing process which optimizes the concentration of long silicon carbide whiskers in the final product.

Separation of solids by screening and sieving is well known to those skilled in the art and is described, e.g., on pages 21-37 to 21-44 of said Perry and Chilton's Chemical Engineers Handbook, supra. the disclosure of which is hereby incorporated by reference into this specification. As is known to those skilled in the art, the size of the sieve openings used will dictate what size will be obtained from the dried slurry.

In one preferred embodiment, illustrated in FIG. 1, the partially dried slurry is passed via line 42 to multi-deck vibratory sieve 44, wherein it is pelletized. Multi-deck vibratory sieve 44 contains at least a top sieve and a bottom sieve and, preferably, is a twin-deck vibratory sieve. In this embodiment, two sieves are used to pelletize the slurry and produce the pellets of this invention. The slurry is first passed through a top sieve with sieve openings of from about 8 to about 14 millimeters and, preferably, openings of from about 10 to about 12 millimeters. The slurry which passes through this top sieve is then contacted with a bottom sieve with sieve openings of 4 millimeters. The pellets used in the process of this invention are formed between the top sieve and the bottom sieve.

The material passing through the bottom sieve of twin vibratory sieve 44 can be recycled via line 34 into mixer 36 and reslurried therein.

The pelletized material from sieve 44 is passed via line 46 to drier 48. In the drier, the pellets are dried to a moisture content of from about 0.1 to about 2.0 percent, by weight. In general, the pellets are dried at a temperature of about 80 to about 100 degrees centigrade for about 2 hours.

The dried pellets are transferred via line 50 to reactor 52, which is equipped with an igniter. In one preferred embodiment, in such reactor, the pellets are first subjected to a preignition, low-temperature heat treatment step.

In the preheating step, the dried pellets are then poured into a reactor and preheated while under an atmosphere selected from the group consisting of air, nitrogen, or inert gas. The pellets are preheated to a temperature of from about 200 to about 300 degrees centigrade; it generally takes no longer than about 40 minutes before the pellets reach this temperature. In general, the preheating is conducted for a period of from about 10 to about 40 minutes and, preferably, from about 15 to about 25 minutes. It is preferred to conduct the preheating in an inert atmosphere. Suitable inert gases include argon, helium, and the like. The most preferred inert gas is argon. Mixtures of the above inert gases also can be used.

Once the pellets have been preheated to a temperature of from 200 to about 300 degrees centigrade, they are ignited. It is preferred that the gas used in the ignition system, which preferably is inert, be at ambient pressure, although slight deviations from ambient pressure are allowable. In general, one may one may use gas at a pressure of from about 90 to about 110 percent of ambient pressure.

In one preferred embodiment, the dried pellets are preheated while under nitrogen atmosphere. In this embodiment, it is preferred to heat the nitrogen to a temperature of about 400 degrees centigrade, pass it into the reactor, and contact it with the pellets in order to preheat them. Thus, nitrogen is fed via line 54 into heater 56, wherein it is heated to a temperature of 400 degrees centigrade and thereafter fed via line 58 into reactor 52 wherein it is contacted with the pellets.

The pellets are then ignited. Any suitable source of heat, such as a spark, a flame, a beam, a hot wire, and the like, can be used to ignite the pellets. In general, the ignition source must be at a temperature of at least about 670 degrees centigrade and, preferably, from about 670 to about 800 degrees centigrade.

Once the pellets have been ignited, they burn spontaneously in a self-sustaining reaction which produces a substantial amount of heat. In general, the reaction wave propagates at a rate of from about 0.1 centimeters per second to about 1.5 centimeters per second. The reaction time is a function of the amount of pellets being combusted. The reaction temperature is generally from about 1700 to about 2300 degrees centigrade.

In one preferred embodiment, the pellets are ignited with a hot wire. A chromel-alumel hot wire which is red hot and at a temperature of at least about 800 degrees centigrade is used to ignite the pellets. Once the pellets are ignited, the ignition point is transformed into a reaction front which consumes at a velocity of from about 0.1 to 1.5 centimeters per second.

The reacted pellets are then discharged via line 60 to refractory tray 62, wherein they are allowed to cool under ambient conditions to a temperature of from about ambient to about 200 degrees centigrade room temperature.

The reacted pellets are comprised of both impure material and the desired composite of alpha silicon carbide whiskers and alumina. In one embodiment, the curde product is gently crushed by screening.

In this embodiment, the cooled pellets are then passed via line 64 to four-deck vibratory sieve 66. The vibratory sieve 66 preferably has at least five sieves which sequentially screen and/or treat the combusted pellets.

The first screen in the vibratory sieve, into which the combusted pellets are first discharged, is 2.5 mesh (8 millimeters sieve opening). Material which passes through this sieve is then passed to the second vibratory sieve.

The second screen in the vibratory sieve is 16 mesh (1 millimeter sieve opening). It is preferred to locate rubber rings in the bottom of said sieve; these rings are solid rubber and are about 1.0 inch in diameter. The rubber rings gently crush the pellet material. Material which passes through the second sieve is passed to the third vibratory sieve.

The third vibratory sieve is 28 mesh (0.6 millimeter opening). The bottom of this sieve also contains 1.0 inch diameter rubber rings to assist in gently crushing the pellet material. Material which passes through this third sieve is primarily silicon carbide whisker material and alumina powder and alumina agglomerates, and it passes to the fourth vibratory sieve.

The fourth vibratory sieve is 60 mesh (0.25 millimeter opening) which will separate the valuable silicon carbide whisker material (which also contains some alumina agglomerates) from the rest of the pellets. The material which passes through this sieve is collected on the bottom pan. This material is a mixture of dispersed silicon carbide whiskers in alumina powder.

The desired silicon carbide whisker material, which is collected on the pan, is a composite precursor comprised of from 25 to 45 percent of alpha silicon carbide (by weight of silicon carbide and alumina), from about 63 to about 71 percent of alumina (by weight of silicon carbide and alumina). The silicon carbide material in the composite precursor comprises at least 80 weight percent (by weight of silicon carbide) of silicon carbide whiskers.

If material remains on the first sieve, it is passed via line 68 to mill 70 where it is ground, preferably together with 0.1 percent (by weight) of oleic acid until it will pass a 325 mesh sieve, and the ground material is then passed via line 18 to ball mill 10. If no material remains on the first sieve, then the material which remains on the second sieve is so ground and recycled. If no material remains on the second sieve, then the material which remains on the third sieve is ground and recycled. In no material remains on the third sieve, then a portion of the material which remains on the fourth sieve is so ground and recycled. The material passing through the fourth sieve is a composite of silicon carbide whiskers and aluminum oxide powder; it may be hot-pressed into ceramic articles.

Heat treatment of the silicon carbide composite material

In one preferred embodiment, the material passing trhough the fourth sieve is subjected to a heat-treatment cycle. In this embodiment, the material is introduced into a high-temperature furnace.

Referring to FIG. 1, the composite material from the fourth sieve and the bottom pan is passed via line 72 to furnace 74, where it is heat-treated. The heat-treated material from furnace 74 is thereafter passed via line 76 to vibratory screen 78.

The heat-treatment occurs in a high-temperature furnace able to reach a temperature in excess of 1,600 degrees centigrade; it is passed via line 72 to furnace 74. Such high-temperature furnaces are well known to those skilled in the art and are described, e.g., on pages 606-612 (and in the references cited in these pages) of the McGraw-Hill Encyclopedia of Science & Technology, Volume 5 (McGraw-Hill Book Company, New York, 1977) the disclosures of which are hereby incorporated by reference into this specification.

High-temperature furnace 74 is preferably a graphite furnace containing a graphite heating element or inductive susceptor; and the heat treatment process is conducted under a protective atmosphere such as nitrogen or an inert atmosphere in the absence of oxygen or oxygen-containing gas. Suitable inert gases include argon, helium, and the like.

After the composite material is charged to the furnace and the furnace is purged with the protective gas, the material is subjected to a specified heat profile. The composite material is first heated from ambient temperature to a temperature of from about 900 to about 1100 degrees centigrade at a rate of from about 8 to about 15 degrees per minute. It is preferred to first heat the composite material from ambient conditions to a temperature of from about 950 to about 1050 degrees centigrade at a rate of from about 10 to about 12 degrees per minute.

In the second step of the heat treatment, the material is raised from its temperature of from about 900 to about 1100 degrees centigrade to a temperature of from about 1250 to about 1250 degrees centigrade at a rate of from about 2 to about 5 degrees per minute. It is preferred to raise it to a temperature of from about 1300 to about 1325 degrees centigrade at a rate of from about 3 to about 4 degrees per minute.

In the third step of the heat treatment, the material may be raised from its temperature of from about 1250 to about 1350 degrees centigrade to a temperature of from about 1550 to about 1650 degrees centigrade at a rate of from about 8 to about 15 degrees per minute. It is preferred to raise the material to a temperature of from about 1600 to about 1630 degrees centigrade at a rate of from about 10 to about 12 degrees per minute.

After the material has been raised to a temperature of from about 1550 to about 1650 degrees centigrade, it may be maintained at such temperature for about at least 30 minutes and, preferably, from about 30 to about 60 minutes. Thereafter, the material is allowed to cool under the protective atmosphere until it reaches ambient temperature. Alternatively, one can induce additional cooling by cooling means in the furnace.

The cooled material is discharged via line 76 to vibratory sieve 78. It is preferred that vibratory sieve 78 be substantially identical to vibratory sieve 66.

In another embodiment, the material from vibratory sieve 66 is subjected to an alternative heat treatment cycle under a high-purity nitrogen atmosphere. In this embodiment, the first two steps of the heat treatment cycle are identical to those described above. In the third step, however, the material is raised from its temperature of from about 1250 to about 1350 degrees centigrade to a temperature of from about 1750 to about 1850 degrees centigrade at a rate of from about 5 to 10 degrees per minute. It is preferred to raise the material to a temperature of from about 1750 to about 1800 degrees centigrade at a rate of from about 6 to 8 degrees per minute. After the material has been raised to this elevated temperature, it is maintained at this temperature for from about 90 to about 120 minutes under nitrogen atmosphere. The product obtained in this embodiment is a composite of silicon carbide whiskers in a matrix of aluminum oxynitride powder.

In another embodiment, the composite of silicon carbide whiskers and aluminum oxynitride is subjected to a temperature of from about 1,900 to about 2100 degrees centigrade for from about 90 to about 120 minutes. This further treatment facilitates the separation of the silicon carbide whiskers (which are converted in part to platelets) from the aluminum oxynitride matrix.

In another embodiment, the composite material from vibratory sieve 78 is subjected to froth flotation in order to separate the aluminum oxide from the silicon carbide whiskers. In this froth flotation separation process, one uses an ionic surfactant which will cause the silicon carbide whiskers to disperse in solution and form a stable suspension while causing the aluminum oxide powder to agglomerate and precipitate.

In one embodiment, any or all of the silicon carbide whisker composites of this invention are formed into shaped bodies with an interstitial porosity of from about 50 to about 80 volume percent, which bodies have sufficient strength to be manipulated and subjected to liquid infiltration of molten metals. The silicon carbide whisker composite can be formed into such porous body by cold isostatic pressing, by hot die casting under low pressure, or by injection molding. The green bodies so formed are then fired at a temperature of from about 1300 to about 1500 degrees centigrade for from about 1 to about 2 hours. The porous bodies thus formed can then be infiltrated with molten alloy metals such as, e.g., aluminum based alloys, magnesium based alloys, titanium based alloys, nickel based alloys, and the like. The infiltrated bodies represent a class of metal-matrix composites reinforced by a ceramic phase.

In one preferred embodiment, a structural ceramic body with improved fracture toughness, wear resistance, and abrasiveness is provided. In this embodiment, the silicon carbide whisker composite from vibratory sieve 66 and/or 78 is transferred to a mold and subjected to hot-pressing at a temperature of from about 1600 to about 1700 degrees centigrade and a pressure of from about 200 to about 600 atmospheres. Alternatively, and/or additionally, one my use hot isostatic pressing at a temperature of from about 1300 to about 1500 degrees centigrade and a pressure of from about 1,000 to about 2,000 atmospheres for from about 30 minutes to about 2.0 hours.

In one embodiment of this invention, a process is provided in which pellets are prepared from said silica, said aluminum, and said carbon agglomerate in precisely the manner described above with one exception: from about 5 to about 20 weight percent (by total weight of pellet) of a moderator are used to prepare pellets. With the exception of the addition of the moderator prior to pelletizing to the silica/aluminum/carbon mixture, ever other aspect of the prior process is the same.

As used in this specification, the term moderator refers to a material in a condensed phase, such as aluminum oxide or silicon carbide powder, which is mixed with the reagents to slow down the combustion front velocity occurring after ignition.

In this embodiment, it is preferred to add from about 8 to about 15 weight percent of the moderator (by total weight of pellet) to the silica/aluminum/carbon mixture.

The moderator is preferably ground with the carbon, the source of metal-containing component (if any), and the source of hydrogen fluoride (if any) to prepare the carbon agglomerate. Thereafter, as before, the carbon agglomerate is mixed with the silica slurry and the aluminum.

As indicated above, the moderator may be the silicon carbide whisker/alumina composite. Alternatively, or additionally, the moderator may be silicon carbide only, alumina only, mixtures of silicon carbide and alumina, other inert materials, etc. Suitable inert materials include, e.g., graphite powder or fiber, and refractory ceramic oxide or non-oxide materials.

Without wishing to be bound to any particular theory, applicant believes that moderation permits control of the reaction and the use of thermal energy freed during the process. Any possible means of moderation should have the capacity of slowing down the reaction rate in some degree and influencing one of the elementary processes of the reaction kinetics (such as the chemical process proper, the diffusion of reactants, nucleation, and crystal growth of products).

Moderation may be achieved by a decrease of the reaction rate caused by a reduction in the surface energy of the reactants. Such a reduction can be caused by increasing grain sizes, covering the grains with a thin layer of inert oxide, or adsorption on the reactant surface of a mono- or poly-molecular layer of a surface-active agent.

Moderation may be achieved by partial absorption of the energy generated by the reaction. This absorption can occur in a fluidized bed reaction with continuous injection and cyclic ignition; in this embodiment, the thermal energy obtained is rapidly removed from the system and can be used for other purposes. This adsorption can occur with the introduction of inert substances which do not react with either the reactants or the products but absorb part of the thermal energy released during the reaction; these substances are mixed in the reactant composition and undergo physical transformations (melting or sublimation) or chemical transformation (decomposition or combustion). This absorption can be effected by introduction of chemically inert substances which do not react with either the reactants or products but interpose themselves between the reactants and delay diffusion of the more mobile reactant towards the "covered" one.

The moderator substance may act by densifying the reaction product and, by that, reducing the reactant diffusion rate. Alternatively, the moderator may aggregate the more mobile reactant, causing it to diffuse from the interior to the surface of the inert substance and only after that through the product layer to the reaction zone.

Moderation may result from introduction of active substances which enter into weak exothermic or even mildly endothermic reactions with the reaction product. In this case, one may obtain valuable secondary products sintering jointly with the main reaction products. One may create an oxidizing, reducing, or inert environment in the course of the reaction, simultaneously increasing the pressure under which the reaction takes place.

Moderators may be grouped according to their reaction mode. Thus, one classification is moderators which leave the system while the reaction is in progress, or those which are readily eliminated after its completion. For example, organic powders that mechanically separate the reactant groups from one another may be used (such as, e.g., rubber, resins, etc.); they leave the system entirely while the reaction advances through combustion or volatilization. For example, organic binders which are adsorbed on the surface of the grains may be used (e.g., waxes, higher fatty acids, higher alcohols); they are similarly eliminated. For example, inorganic salts which interpose themselves between reactant groups may be used (e.g., sodium chloride, potassium chloride); they are totally or partially eliminated by decomposition or volatilization, and the residue is readily eliminated by leaching.

Another classification is moderators which do not leave the system. Thus, one may use reaction products that interpose themselves between groups of reactants and also between individual reactants and thicken the reaction prdocut layer between the covered reactant and the covering one; this category of moderators remains in the system and may sinter together with reaction products (e.g., alumina). Thus, one may use an excess of metallic oxide; the surplus acts as a moderator by delaying diffusion; this moderator also remains in the system and may sinter with the products (e.g., excess silica). One may also use compounds which react with the products; these secondary products can take part in subsequent sintering processes (e.g., carbon).

In this embodiment, the use of a moderator allows one to obtain a composite with a higher yield of long silicon carbide whiskers.

Preparation of silicon nitride whiskers

The process of this invention can be utilized to prepare materials other than silicon carbide whiskers.

Thus, for example, silicon nitride whiskers may be prepared by such process.

In this embodiment, the pellet produced in the process is comprised from about 46 to about 58 weight percent (by total weight of solid material in the pellet) of silica, from about 26 to about 36 weight percent of aluminum material, and from about 6 to about 28 weight percent of silicon nitride. The same silica starting material described above is used; the same aluminum material also is used. The silicon nitride material used is alpha silicon nitride which has at least 90 weight percent of alpha silicon nitride and less than about 1 percent of free silicon. A suitable silicon nitride material is that sold by Hermann C. Stack Company (West Germany) under the designation of "Grade H2."

In this embodiment, the silica is first well dispersed in a nonaqueous liquid. Thereafter, the aluminum material and the silicon nitride material are mixed with the silica slurry. The silica/aluminum/silicon nitride slurry is then pelletized, preferably by sieving as described above, to produce pellets which contain from about 80 to about 92 volume percent of solids and which have a density of from about 0.3 to about 1.7 grams per cubic centimeter. These pellets are thereafter dried to a moisture content of from about 0.1 to about 2.0 percent, and the dried pellets are placed is a pressurized reactor under nitrogen atmosphere; the pressure used is from about 150 to about 7,000 pounds per square inch. Once the pellets are in the pressurized reactor, they are ignited by being subjected to a heat source at a temperature of at least about 670 degrees centigrade.

Preparation of titanium diboride whiskers

In one embodiment, titanium diboride whiskers are prepared by the process of this invention. In this embodiment, the charge is comprised of from about 25 to about 65 percent (by total weight of solids in the pellet) of boron oxide, from about 28 to about 38 weight percent of titanium diboride, and from about 32 to about 42 weight percent of aluminum material.

In this embodiment, the boron oxide is dried to a moisture content of less than about 1.0 weight percent of water. This dried boron oxide is then dry-ground in a vibratory mill, preferably in the presence of from about 0.1 to about 0.5 weight percent of surfactant (such as, e.g., oleic acid); the boron oxide is preferably ground until at least about 80 weight percent of its particles are smaller than 10 microns.

After the boron oxide has been ground to the desired degree of fineness, titanium dioxide and aluminum material are added to the mill; the aluminum material is identical to that described above. The reaction mixture is then ground to agglomerate it.

The agglomerate produced in the vibratory mill is then pelletized in, e.g., an Eirich mixer in the presence of paraffin oil (or, alternatively, in the presence of one or more other suitable binders). The pellets thus produced are then subjected to heat treatment under ambient conditions at a temperature of from about 400 to about 600 degrees centigrade in a pusher type furnace for from about 10 to about 20 minutes.

The heat treated pellets are then ignited in a reactor by being contacted with a heat source at a temperature of at least about 1,000 degrees centigrade.

Preparation of boron carbide whiskers

In another embodiment, boron carbide whiskers are prepared by the process of this invention. In this embodiment, the pellet is comprised of from about 55 to about 65 weight percent of boron carbide, from about 41 to about 46 weight percent of aluminum material, and from about 4 to about 8 weight percent of amorphous carbon. The amorphous carbon, the aluminum material, and the boron oxide material are described above.

In this embodiment, the procedure described for the preparation of titanium diboride whiskers is used, with the exceptions that: (1) the weight ratios of the starting materials are different, (2) the agglomerate is heat-treated under nitrogen atmosphere, and (3) the ignition temperature is at least about 700 degrees centigrade.

Preparation of titanium carbide whiskers

The process of this invention also may be used to prepare titanium carbide whiskers. In this embodiment, the pellet is comprised of from about 33 to about 38 weight percent of titanium dioxide (rutile), from about 45 to about 52 weight percent of aluminum material, from about 16 to about 20 weight percent of amorphous carbon, from about 1 to about 5 weight percent of a source of carbon monoxide, and from about 1 to about 5 weight percent of a source of hydrogen fluoride.

In the first step of this process, a mixture of the titanium dioxide, the source of carbon monoxide, and nonaqueous liquid is prepared. As with the silicon carbide whisker process, the titanium dioxide slurry should be well dispersed and have no agglomerates.

In the second step of the process, an agglomerated mixture of the amorphous carbon and the source of hydrogen fluoride is prepared. Thereafter, this agglomerated mixture and aluminum material are mixed with the titania slurry. The slurry thus produced is pelletized by sieving in accordance with the procedure described for the silicon carbide whiskers, and the pellets so produced are then dried and ignited as described above.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:
1. A process for preparing a ceramic composite which is comprised of alpha silicon carbide whiskers and alpha aluminum oxide powder, comprising the steps of sequentially:
   (a) providing a slurry comprised of from about 80 to about 92 volume percent of solid material and from about 20 to about 8 volume percent of non-aqueous liquid, wherein:
   1. said solid material comprises from about 30 to about 38 weight percent of aluminum material, from about 10 to about 14 weight percent of amorphous carbon, and from about 52 to about 62 weight percent of silica;
   2. said aluminum material has a specific surface area of from about 0.2 to about 1.1 square meters per gram, has a particle size distribution which ranges from about 4 to about 28 microns, and has at least 80 weight percent of its particles being in the range of from about 6 to about 12 microns;
   3. said amorphous carbon has a specific surface area of at least 4 square meters per gram;
   4. said silica has a specific surface area of from about 1.2 to about 400 square meters per gram;

5. said non-aqueous liquid is volatile at a temperature of 80 degrees centigrade;
6. said slurry is comprised of from about 1 to about 5 weight percent of a source of carbon monoxide, which, when it is subjected to a temperature of from about 700 to about 1,600 degrees centigrade, generates carbon monoxide;
7. said slurry is comprised of from about 1 to about 5 weight percent of a source of hydrogen fluoride which, when subjected to a temperature of from about 200 to about 400 degrees centigrade, generates hydrogen fluoride;

(b) pelletizing said slurry to provide a multiplicity of pellets comprised of from about 80 to about 92 volume percent of solids;
(c) drying said pellets to a moisture content of from about 0.1 to about 2.0 weight percent;
(d) preheating said dried pellets to a temperature of from about 200 to about 300 degrees centigrade; and
(f) igniting said pellets.

2. The process as recited in claim 1, wherein said aluminum material is aluminum, and wherein:
(a) said composite comprised of alpha silicon carbide and alumina is heated to a temperature of from about 900 to about 1,100 degrees centigrade at a rate of from about 8 to about 15 degrees per minute and, thereafter,
(b) the temperature of said composite is raised from a temperature of from about 900 to about 1,100 degrees centigrade to a temperature of from about 1,250 to about 1,350 degrees centigrade.

3. The process as recited in claim 1, wherein said source of hydrogen fluoride is selected from the group consisting of potassium hydrogen fluoride, sodium hydrogen fluoride, ammonium hydrogen fluoride, and mixtures thereof.

4. The process as recited in claim 1, wherein said dried pellets are preheated in the presence of nitrogen.

5. The process as recited in claim 4, wherein said silica has a specific surface area of from about 50 to about 300 square meters per gram.

6. The process as recited in claim 5, wherein said source of carbon monoxide is a carboxylic acid containing from about 10 to about 24 carbon atoms.

7. The process as recited in claim 6, wherein said aluminum material is aluminum flakes with a specific surface area of from about 0.6 to about 0.7 square meters per gram.

8. The process as recited in claim 6, wherein said carboxylic acid is stearic acid.

9. The process as recited in claim 8, wherein at least about 90 weight percent of said aluminum flakes have a particle size in the range of from about 6 to about 12 microns.

10. The process as recited in claim 9, wherein said source of hydrogen fluoride is potassium hydrogen fluoride.

11. The process as recited in claim 10, wherein said amorphous carbon contains less than about 1.5 weight percent of combined sulfur.

12. The process as recited in claim 11, wherein said non-aqueous liquid is selected from the group consisting of acetone, benzene, toluene, and n-petroleum ether.

13. The process as recited in claim 12, wherein said dried pellets are preheated for from about 10 to about 40 minutes.

14. A pellet comprised of from about 98 to about 99.9 weight percent of solid material, having a density of from about 0.3 to about 1.7 grams per cubic centimeter and having a minimum dimension of at least about 4 millimeters, wherein:
1. said pellet comprises from about 30 to about 38 weight percent of aluminum material, from about 10 to about 14 weight percent of amorphous carbon, and from about 52 to about 62 weight percent of silica, from about 1 to about 5 weight percent of a source in a condensed phase of carbon monoxide, and from about 1 to about 5 weight percent of a source in a condensed phase of hydrogen fluoride;
2. said aluminum material has a specific surface area of from about 0.2 to about 1.1 square meters per gram, has a particle size distribution which ranges from about 4 to about 28 microns, and has at least 80 weight percent of its particles being in the range of from about 6 to about 12 microns;
3. said amorphous carbon has a specific surface area of at least 4 square meters per gram;
4. said silica has a specific surface area of from about 1.2 to about 400 square meters per gram;
5. said source of carbon monoxide, when it is subjected to a temperature of from about 700 to about 1,600 degrees centigrade, generates carbon monoxide; and
6. said source of hydrogen fluoride, when subjected to a temperature of from about 200 to about 400 degrees centigrade, generates hydrogen fluoride.

15. A pellet comprised of from about 98 to about 99.9 weight percent of solid material, having a density of from about 0.3 to about 1.2 grams per cubic centimeter, and having a minimum dimension of at least about 4 millimeters, wherein:
1. said pellet comprises from about 17 to about 22 weight percent of aluminum material, from about 19 to about 24 weight percent of amorphous carbon, from about 56 to about 65 weight percent of silica, from about 1 to about 5 weight percent of a source in a condensed phase of carbon monoxide, and from about 1 to about 5 weight percent of a source in a condensed phase of hydrogen fluoride;
2. said aluminum material has a specific surface area of from about 0.2 to about 1.1 square meters per gram, has a particle size distribution which ranges from about 4 to about 28 microns, and has at least 80 weight percent of its particles being in the range of from about 6 to about 12 microns;
3. said amorphous carbon has a specific surface area of at least 4 square meters per gram;
4. said silica has a specific surface area of from about 1.2 to about 400 square meters per gram;
5. said source of carbon monoxide, when it is subjected to a temperature of from about 700 to about 1,600 degrees centigrade, generates carbon monoxide; and
6. said source of hydrogen fluoride, when subjected to a temperature of from about 200 to about 400 degrees centigrade, generates hydrogen fluoride.

* * * * *